United States Patent
Ash et al.

(10) Patent No.: US 8,516,749 B2
(45) Date of Patent: Aug. 27, 2013

(54) ENCAPSULATED WINDOW ASSEMBLY WITH INTEGRAL SEAL AND METHOD OF INSTALLING GAME

(75) Inventors: Charles E. Ash, Perrysburg, OH (US); Scott W. Chambers, Perrysburg, OH (US); Julia B. MacLachlan, Toledo, OH (US); Charles Sitterlet, Northwood, OH (US)

(73) Assignee: Pilkington Group Limited, St. Helens (GB)

( * ) Notice: Subject to any disclaimer, the term of this patent is extended or adjusted under 35 U.S.C. 154(b) by 534 days.

(21) Appl. No.: 12/322,548

(22) Filed: Feb. 4, 2009

(65) Prior Publication Data

US 2009/0205187 A1 Aug. 20, 2009

Related U.S. Application Data

(60) Provisional application No. 61/066,357, filed on Feb. 20, 2008.

(51) Int. Cl.
*E06B 7/215* (2006.01)
*B60J 10/10* (2006.01)
*B60J 7/00* (2006.01)

(52) U.S. Cl.
USPC ............ 49/480.1; 296/216.09; 296/146.15; 49/496.1; 49/198.1

(58) Field of Classification Search
USPC .............. 296/216.06–216.09, 84.1, 146.15, 296/146.16, 201, 96.21, 93; 49/480.1, 496.1, 49/498.1
See application file for complete search history.

(56) References Cited

U.S. PATENT DOCUMENTS

| | | | | | |
|---|---|---|---|---|---|
| 3,038,217 | A | * | 6/1962 | Harris | 428/121 |
| 4,826,232 | A | * | 5/1989 | Wissler | 296/216.09 |
| 5,466,508 | A | * | 11/1995 | Brocke et al. | 428/122 |
| 5,538,317 | A | * | 7/1996 | Brocke et al. | 296/216.09 |
| 5,882,066 | A | | 3/1999 | Schonebeck | |
| 6,152,523 | A | * | 11/2000 | Schonebeck | 296/216.09 |
| 6,375,254 | B1 | * | 4/2002 | Patz | 296/216.09 |
| 6,517,150 | B2 | | 2/2003 | DeGaillard et al. | |
| 6,530,618 | B2 | * | 3/2003 | Nozaki et al. | 296/146.9 |
| 7,059,656 | B2 | * | 6/2006 | Mikkaichi et al. | 296/146.15 |
| 2006/0237870 | A1 | * | 10/2006 | Bordeaux et al. | 264/239 |

FOREIGN PATENT DOCUMENTS

| | | | |
|---|---|---|---|
| DE | 3708047 | * | 10/1988 |
| EP | 0304694 | | 3/1989 |
| EP | 0813983 | | 12/1997 |

* cited by examiner

*Primary Examiner* — Dennis Pedder
(74) *Attorney, Agent, or Firm* — Marshall & Melhorn, LLC

(57) ABSTRACT

A encapsulated window assembly may be fixed or movable upon installation into an opening in a vehicle body, particularly a vehicle roof. In order to keep air, water and/or dirt from entering the passenger compartment of the vehicle, an integral seal is molded onto a dielectric substrate material. The seal, upon installation of the assembly into the vehicle body opening, effectively closes the gap between the edge of the window assembly and the sheet metal surrounding the body opening, without the need for a post-applied seal, for example, a preformed bulb seal.

11 Claims, 9 Drawing Sheets

ENCAPSULATED WINDOW ASSEMBLY WITH INTEGRAL SEAL AND METHOD OF INSTALLING GAME

RELATED APPLICATION

This application is claiming the benefit, under 35 U.S.C. 119(e), of the provisional application filed Feb. 20, 2008 under 35 U.S.C. 111(b), which was granted Ser. No. 61/066, 357. This provisional application is hereby incorporated by reference in its entirety.

BACKGROUND

The present invention relates generally to encapsulated window assemblies in which a polymeric frame or gasket member surrounds at least a portion of the peripheral region of a glass sheet.

Encapsulated window assemblies, particularly vehicle roof windows or sunroofs are described in the patent literature, for example:

U.S. Pat. No. 6,375,254 describes a "cover" for a motor vehicle roof which includes a cover "plate", a plastic frame foamed or injected around the edge of the cover plate, thus, forming an edge gap seal. The plastic frame has a groove which is open to the bottom and which is bordered to the outside by a lip which forms the edge gap seal. In the groove is placed a plastic insert made of a material which is softer than the material of the plastic frame. A process for making such a cover, optionally including a reinforcing frame, and for making/placing the plastic insert in the groove of the plastic frame is also described.

U.S. Pat. No. 6,517,150 describes a cover unit for closing the roof opening in a motor vehicle roof, such cover unit having a cover element composed of an, at least, partially transparent plastic, and a reinforcing frame, made, for example, of metal, which extends along the side edge of the cover element, and which bears a seal which surrounds the side edge of the cover element for contact against an essentially vertically running roof-mounted sealing surface. The reinforcing frame is cemented, using flexible cement to the cover element such that the cover element can move in the transverse direction relative to the reinforcing frame in order to enable thermal expansion of the cover element. The seal has a roof sealing area contacting a roof-mounted sealing surface which is substantially unaffected by thermal expansion of the cover element, and the seal has a cover sealing area for compensation of thermal expansion of the cover element.

Suppliers of encapsulated window assemblies to vehicle manufacturers continually search for ways to produce such assemblies which perform well, are aesthetically pleasing, are simple to manufacture, and are cost effective. The encapsulated window assembly of the present application is believed to meet these objectives.

SUMMARY OF THE INVENTION

The present invention is related to an encapsulated window assembly to fill an opening in a vehicle body, in particular a window assembly useful for filling an opening in the roof of a vehicle. To accomplish this objective, an integral seal is molded around at least a portion of a peripheral edge of a dielectric substrate material.

The integral seal is made up of several components, including a base portion, at least one surface of which is molded onto the peripheral edge of the substrate material. A lip portion extends from a separate area of the base portion in a curved configuration. In one embodiment, the lip portion includes a female engaging portion at or near the distal end thereof. In certain embodiments, a male engaging portion extends from yet another area of the base portion of the seal in an orientation so as to be selectively engagable with the female engaging portion.

The benefits of the present invention are realized upon installation of a window assembly utilizing the above-described features in an opening in the sheet metal of a vehicle body, whereby the seal of the subject window assembly is brought into sealing contact with at least a portion of the body sheet metal forming the periphery of the vehicle body opening. In doing so, the lip portion of the seal is compressed such that the lip portion is moved toward the base portion of the seal while at the same time, the lip portion of the seal is exerting a sealing force against the portion of the body sheet metal.

In this application, "installation" may mean a one-time, essentially permanent placement of the encapsulated window assembly in the vehicle body opening, as would be the case for a fixed sunroof. "Installation" may also be applied to the repeated opening/closing of a movable sunroof, during which operation the seal of the present window assembly must be capable of maintaining a sealing configuration relative to the vehicle sheet metal, preferably for the life of the vehicle.

In those embodiments in which a male engaging portion extends from the base portion, the female engaging portion formed in the lip portion is thus brought into engaging contact with the male engaging portion. In such engagement, an open portion is formed, allowing a certain amount of flexibility in the self-engaging seal, so as to exert a relatively constant sealing pressure on the vehicle body sheet metal previously described.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

The present invention relates to an encapsulated window assembly which can be readily installed in an opening in a vehicle body. In particular, the subject encapsulated window assembly is suitable for filling an opening in a vehicle roof, also referred to as a sunroof or a moonroof. The subject window assembly can be made in virtually any shape and/or size desired, although a rectangular shape is illustrated in the present application.

Those skilled in the art of designing and manufacturing sunroofs are well aware of the complexity and costliness of seal assemblies used in connection with known sunroofs. In particular, the necessity of having to install post-manufactured bulb seals, or the like, is well known. It is a primary objective of the present invention to provide an integral seal which eliminates the need for the use of such post-installation seals. The savings in the cost of the bulb seal itself, as well as the savings in labor costs to attach the bulb seal, will be readily appreciated by those skilled in the art.

An encapsulated window assembly according to the present invention comprises a suitably sized sheet or panel of a dielectric substrate material, preferably glass, and most preferably a body tinted or coated soda-lime-silica glass having good solar control properties.

A seal is molded around at least a portion of the periphery of the sheet or panel of substrate material by any suitable method. Preferably, the seal is injection molded, but extrusion or reaction injection molding (RIM) are other possible methods of molding useful with the present invention.

Many known sunroof seal assemblies utilize polyvinylchloride (PVC) for the base part of the encapsulation portion of the assembly, into which the post-applied bulb seal is installed. While PVC is economically attractive, it is difficult to adhere to materials such as glass. Thus, the present invention preferably utilizes one or more of a variety of thermoplastic elastomer (TPE) materials which adheres more readily to glass, is still cost effective, and is flexible enough to function as the one-piece, or integral, seal of the present invention. One preferred TPE material is a styrene-ethylene-butadiene-styrene (SEBS) material which is marketed by Vi-Chem Corporation under the trademark Sevrene®. Other potentially suitable materials for the seal of the present invention include commercially available products marketed under the names: Invision™, Forprene™, Duragrip™, Dynaflex™, Kraton™, Kralburg™, Interion™, Nexprene™, Veralloy™, and GLS™.

The durometer of the materials comprising the self-engaging integral seal have been found to desirably be between 60-90 Shore A. More preferably, the durometer is between 75-85 Shore A. Desirably, the material of the integral seal is also durable. In particular, it is scratch/mar resistant and is resistant to degradation by exposure to UV radiation. The window assembly of the present invention is represented in a variety of ways in the figures which are part of this application.

Figure 1:
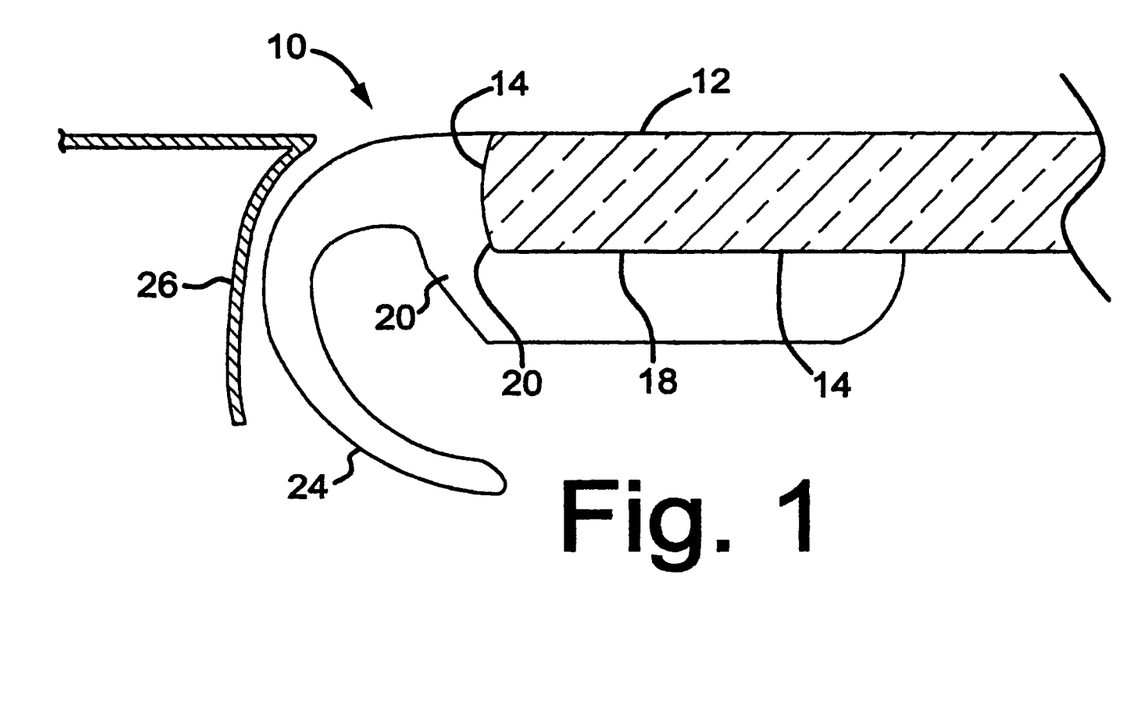
FIG. 1 is a cross-sectional view of a self-conforming, non-engaging seal in accordance with certain embodiments of the invention.

In FIG. 1, an embodiment of the present invention is illustrated, showing a self-conforming, non-engaging seal 10 which has been molded onto the periphery of a dielectric substrate material 12. Bonding surfaces 14 are adhered to the substrate material 12. As shown, the bonding surfaces 14 are adhered to the peripheral portion of a major surface 18 of the dielectric substrate and to a peripheral edge surface 20 thereof, thus forming a so-called 2-sided encapsulation. Bonding to a peripheral portion of a single major surface 18 of the dielectric substrate (single-sided encapsulation) or bonding to peripheral portions of both major surfaces and the edge surface of the dielectric substrate (3-sided encapsulation) are also within the scope of the present invention.

From the base portion 22 of the self-conforming, non-engaging seal 10, a lip portion 24 extends in a curved configuration, and for a distance so as to form a sealing engagement with the body sheet metal 26. It has been found to be preferable that the lip portion 24 have a length at least 200% greater than the distance between the edge of the dielectric substrate 12 and the sheet metal 26 forming the edge of the vehicle body opening. It has also been found that the force exerted by the seal 10 on the vehicle sheet metal 26 should be sufficient to maintain a consistently positive seal, and is preferably between 0.50 lb/100 mm (2.2N/100 mm) and 6 lb/100 mm 26.6N/100 mm) in order to provide a consistently positive seal. In order for the self-conforming, non-engaging seal 10 described herein to achieve these objectives, preferred materials to form the seal are TPE-SW styrenic block copolymers having a durometer in the range of 75 to 85 Shore A. A seal falling within the parameters hereinbefore described is capable of acting as a suitable seal both for a fixed window assembly, and for a movable window assembly.

Figure 8:
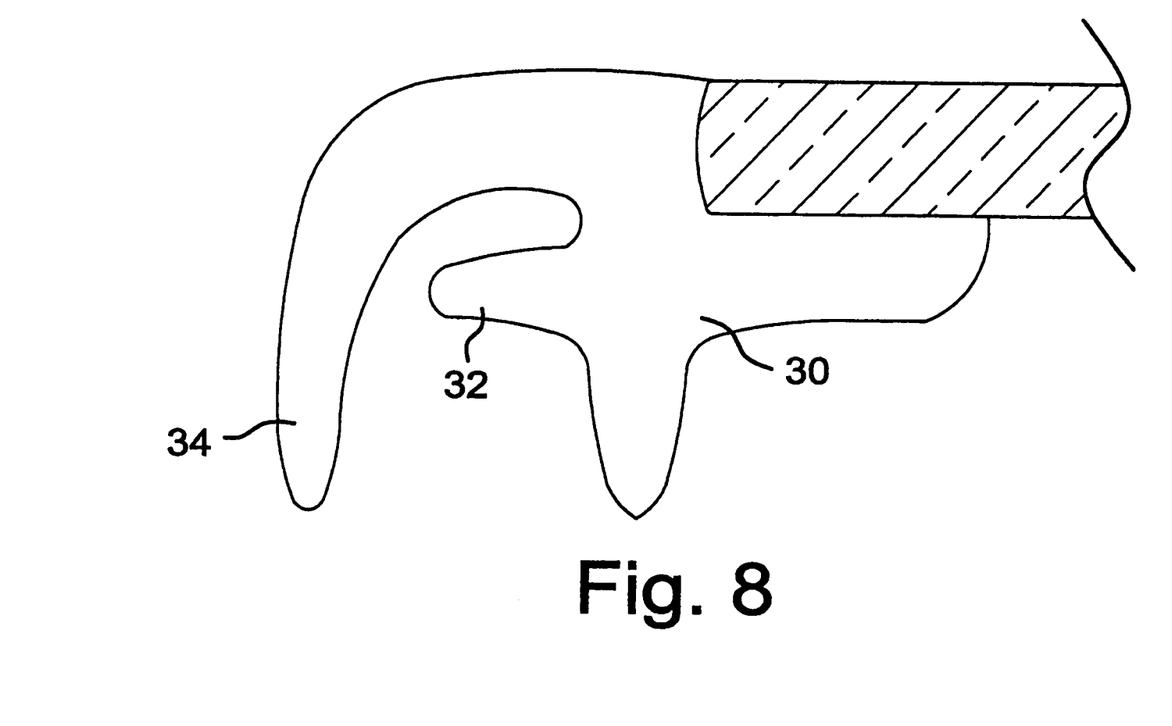
FIG. 8 is a cross-sectional view with a molded-on self-conforming seal having a male stop portion.

A variation of the self-conforming, non-engaging seal 10 of the invention is shown in FIG. 8. An additional feature of the seal illustrated in FIG. 8 is a male stop 32 which extends from the base portion 30 in the general direction of the sheet metal (not shown) forming the vehicle body opening. The male stop 32 prevents the lip portion 34 from being compressed or deformed more than a desired amount, and renders the amount of compression of the lip portion 34 repeatable. The male stop 32 also may provide additional sealing force of the lip portion 34 against the sheet metal of the vehicle body opening. In other significant respects, this variation of the self-conforming, non-engaging seal 10 is substantially similar to the self-conforming, non-engaging seal 10 without the male stop feature.

Figure 2:
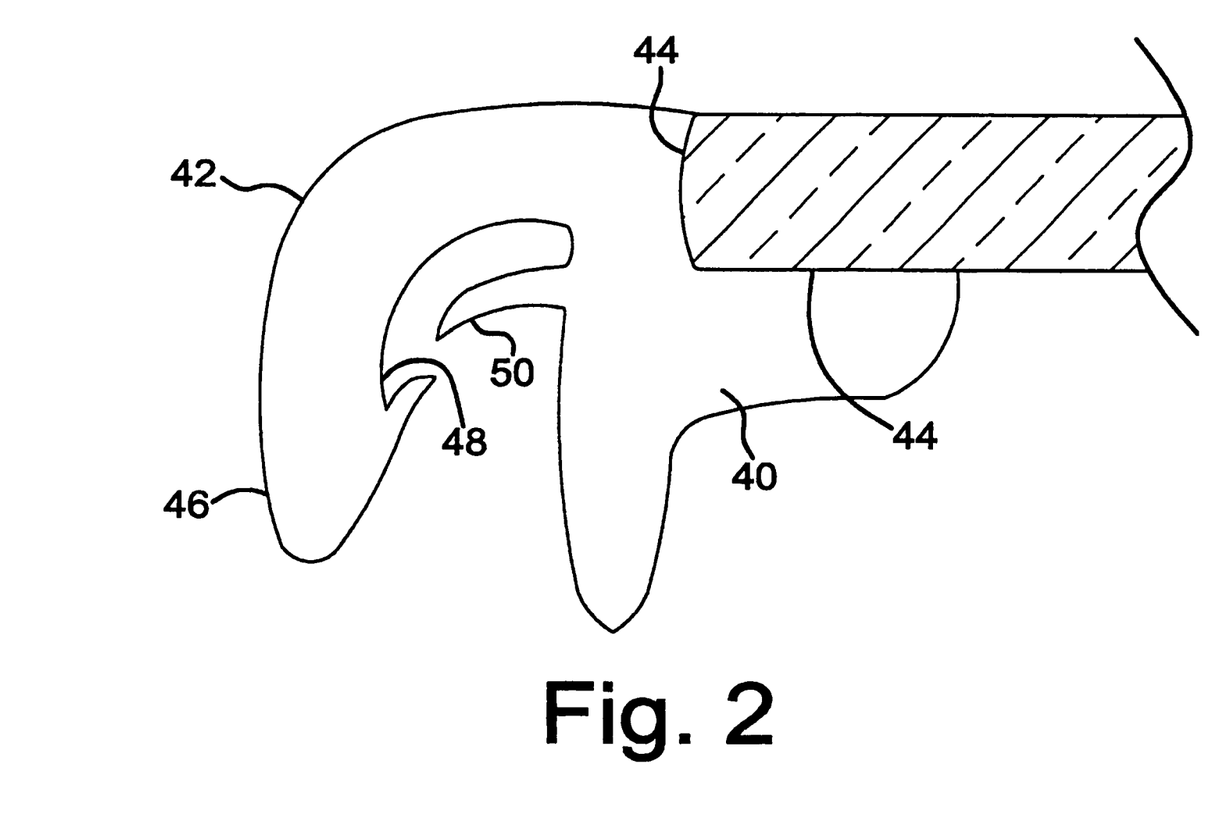
FIG. 2 is a cross-sectional view of one embodiment of a substrate with a molded on self-engaging seal in accordance with other embodiments of the invention.
Figure 4:
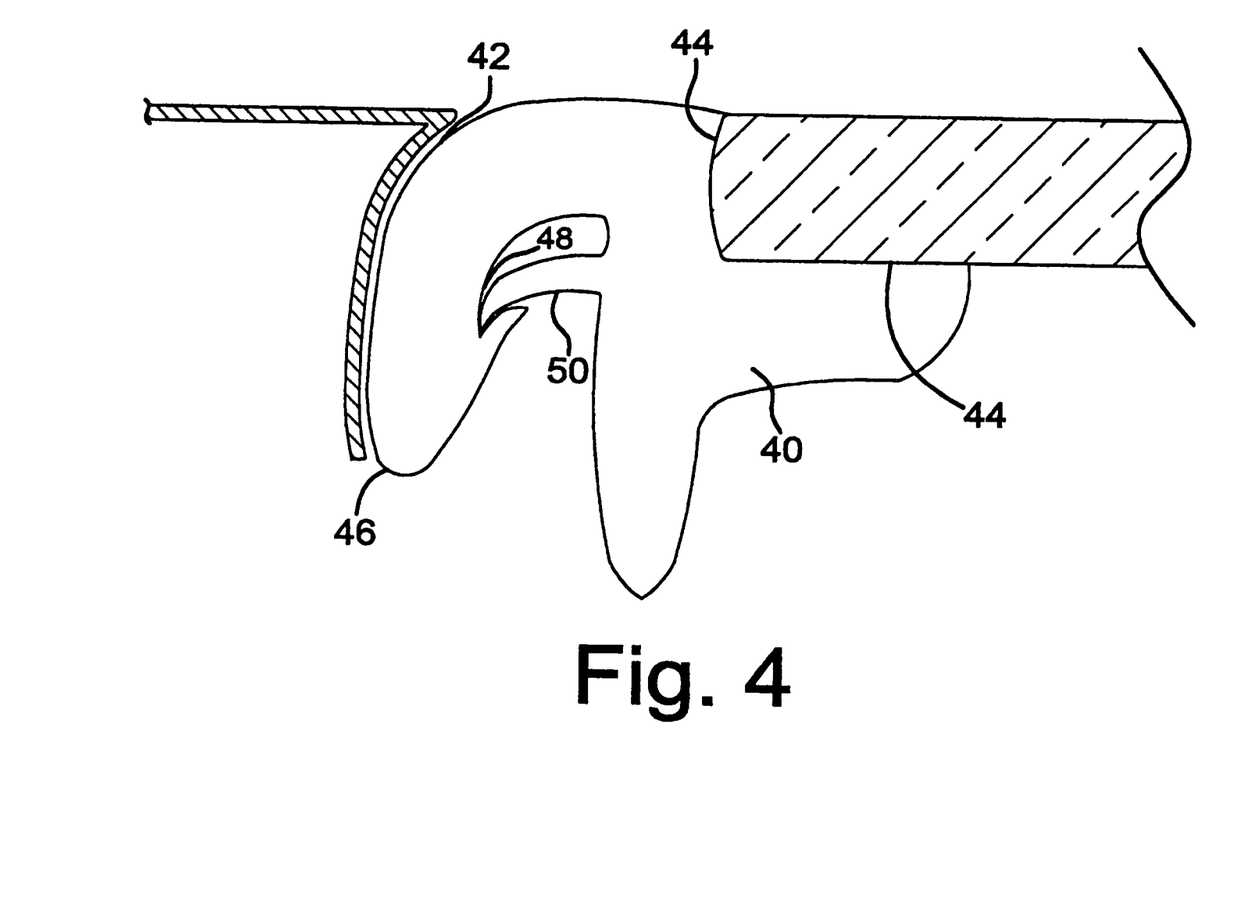
FIG. 4 is a cross-sectional view of the embodiment of FIG. 2 showing the seal as "engaged" upon installation in the opening in a vehicle body.

FIG. 2 illustrates another embodiment of the invention which, in addition to the basic features of bonding surfaces 44, a base portion 40 and a curved lip portion 42, has, at or near the distal end 46 of the lip portion 42, a female engaging portion 48, the function of which will be hereinafter more fully described. Also, extending from the base portion 40, separate from the lip portion 42, is a male engaging portion 50. The primary purpose of the male 50 and female 48 engaging portions is, upon compression of the seal against the vehicle sheet metal, to provide a repeatable deformation of the seal in a manner which will provide a positive sealing force of the lip portion against the vehicle sheet metal through engagement of the male 50 and female 48 engaging portions, as shown in FIG. 4. The sealing force of the self-engaging seal with releasable engagement features (48, 50) has been found to preferably be between 2 lbft/100 mm (8.8N/100 mm) and 6 lbft/100 mm (26.6N/100 mm). The self-engaging seal with releasable engagement features (48, 50) is particularly useful for movable window assembly applications due to the repeatability of its sealing capability.

Figure 3:
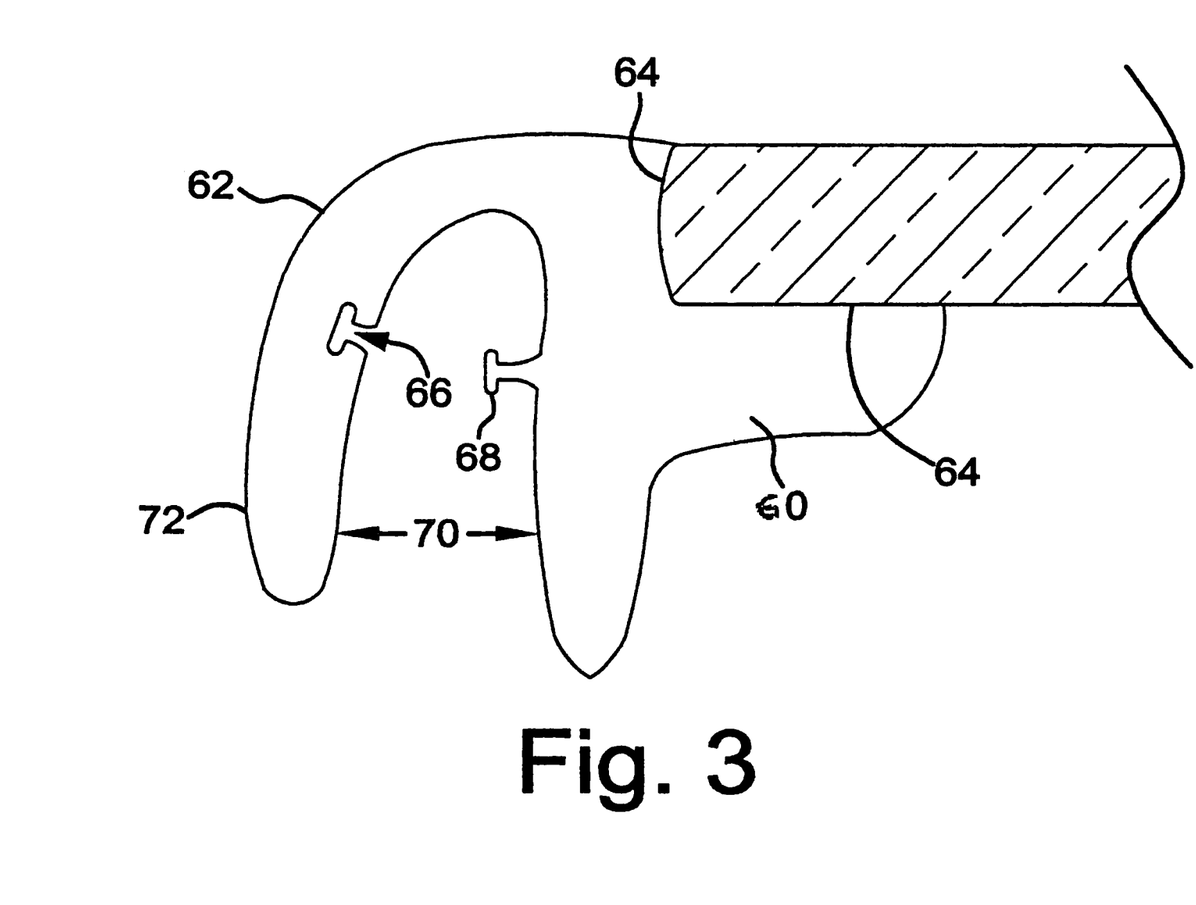
FIG. 3 is a cross-sectional view of an alternative embodiment of a substrate with molded on self-engaging seal having a locking capability.

FIG. 3 illustrates yet another embodiment of the encapsulated window assembly of the present invention having bonding surfaces, a base portion, a curved lip portion 62, a male engaging portion 68 extending from an area of the base portion 60 separate from the lip portion 62, and a female engaging portion 66 formed in the curved lip portion 62. The location of the male 68 and female 66 engaging portions is primarily determined to allow engagement of the male 68 and female 66 engaging portions upon compression of the lip portion 62 in a direction toward the base portion 60. In this embodiment, the male 68 and female 66 engaging portions are capable of lockable engagement so that, after initial engagement, repeatable positive sealing is provided. The open portion 70 created between the lip portion 62 and base portion 60 of the self-engaging seal structure, while providing positive sealing force, also provides some flexibility to accommodate variations in the size of the gap between the edge of the substrate of the window assembly and the sheet metal of the body opening into which the present window assembly is installed. This is true for both the releasable and lockable self-engaging seals. The self-engaging seal with lockable male 68 and female 66 engaging portions is particularly suitable for movable vehicle window assemblies.

Figure 9:
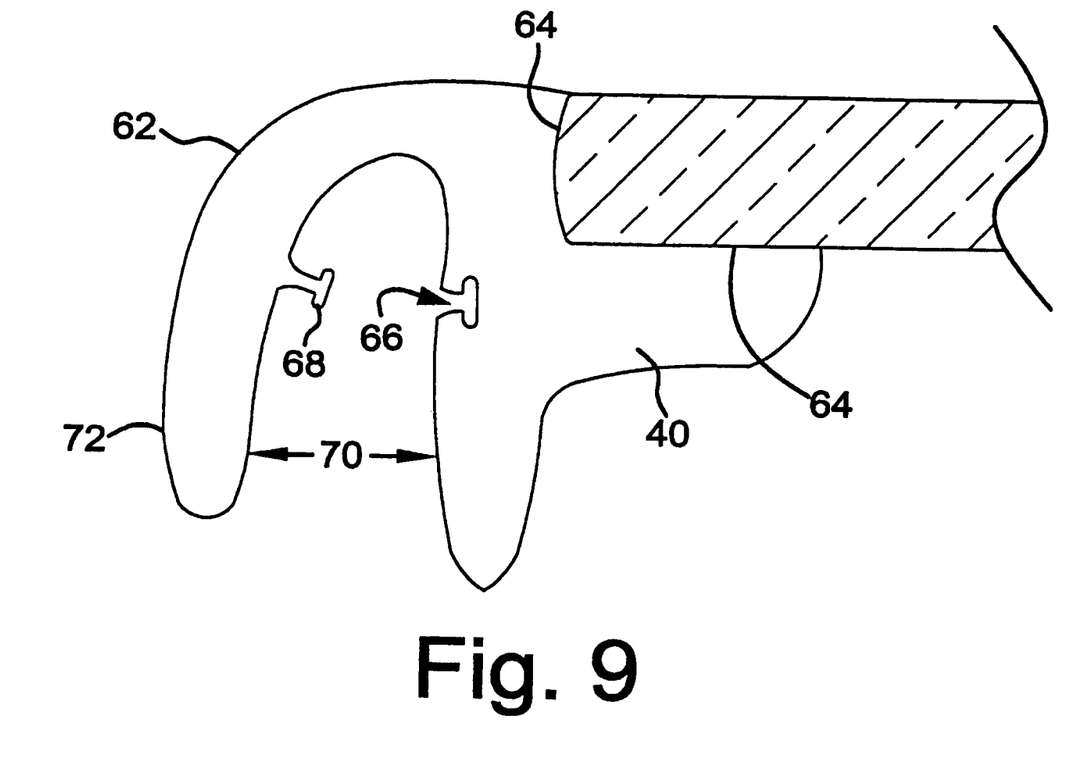
FIG. 9 is a cross-sectional view of an alternative embodiment of the embodiment shown in FIG. 3 in accordance with the invention.

With regard to the lockable self-engaging seal, it is within the scope of the present invention to alter the location of the male 68 and female 66 engaging portions so that the male engaging portion 68 extends from the distal end 72 of the lip portion 62, and the female engaging portion 66 is located in the base portion 60 in a manner that allows for engagement of the male 68 and female 66 engaging portions as shown in FIG. 9.

Figure 5:
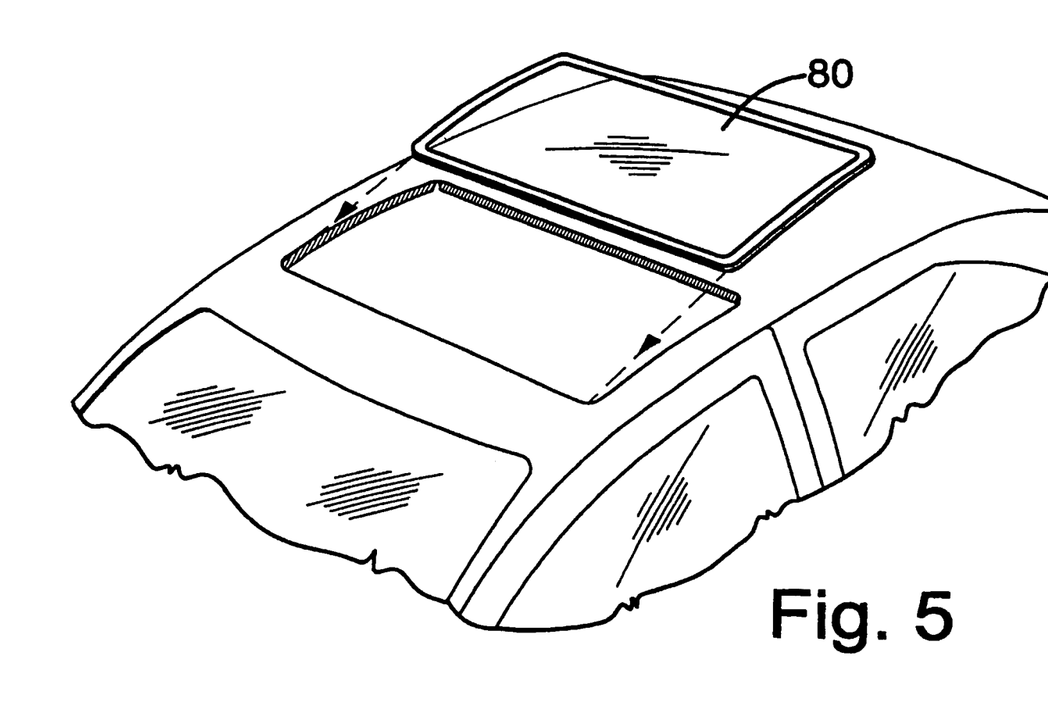
FIG. 5 is a perspective view of a window assembly of the present invention in installing relationship to the opening in a vehicle roof.
Figure 6:
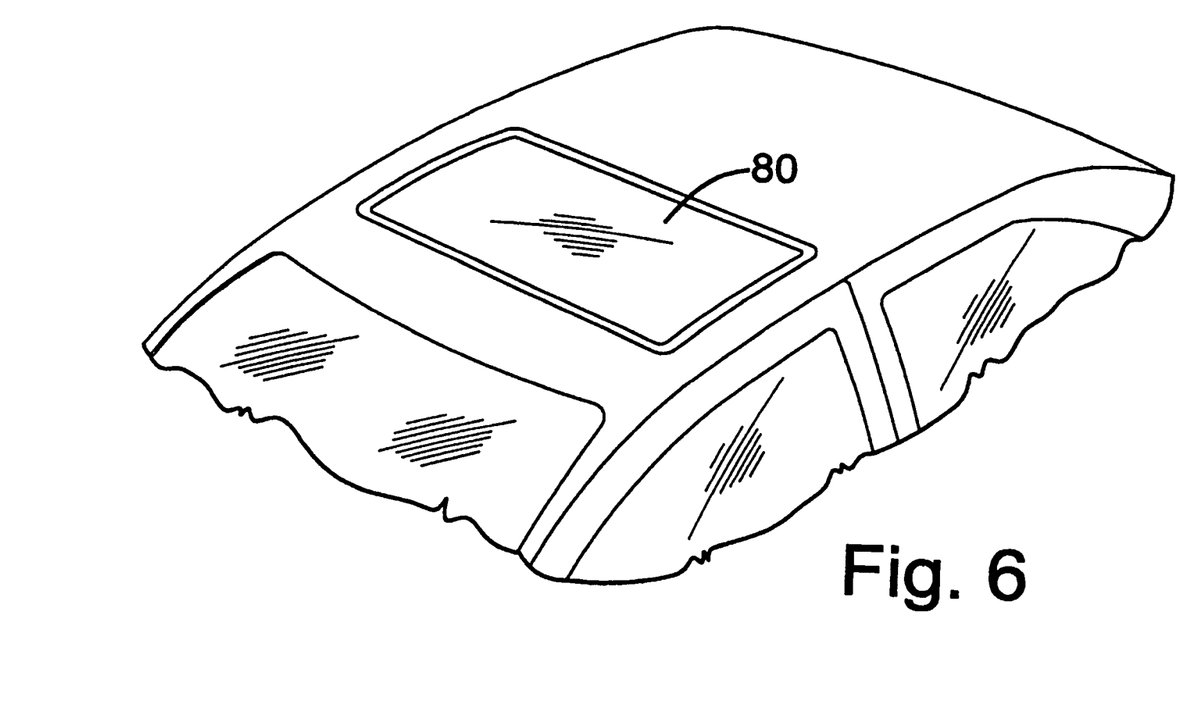
FIG. 6 is a perspective view of a window assembly of the present invention installed in the opening in a vehicle roof.

FIG. 4 illustrates the self-engaging seal of FIG. 2 wherein the male 50 and female 48 engaging portions are engaged, as they would be when, for example, the removable sunroof panel 80 of FIG. 5 is installed in a vehicle body opening, and is in a closed position, as shown in FIG. 6.

Figure 7:
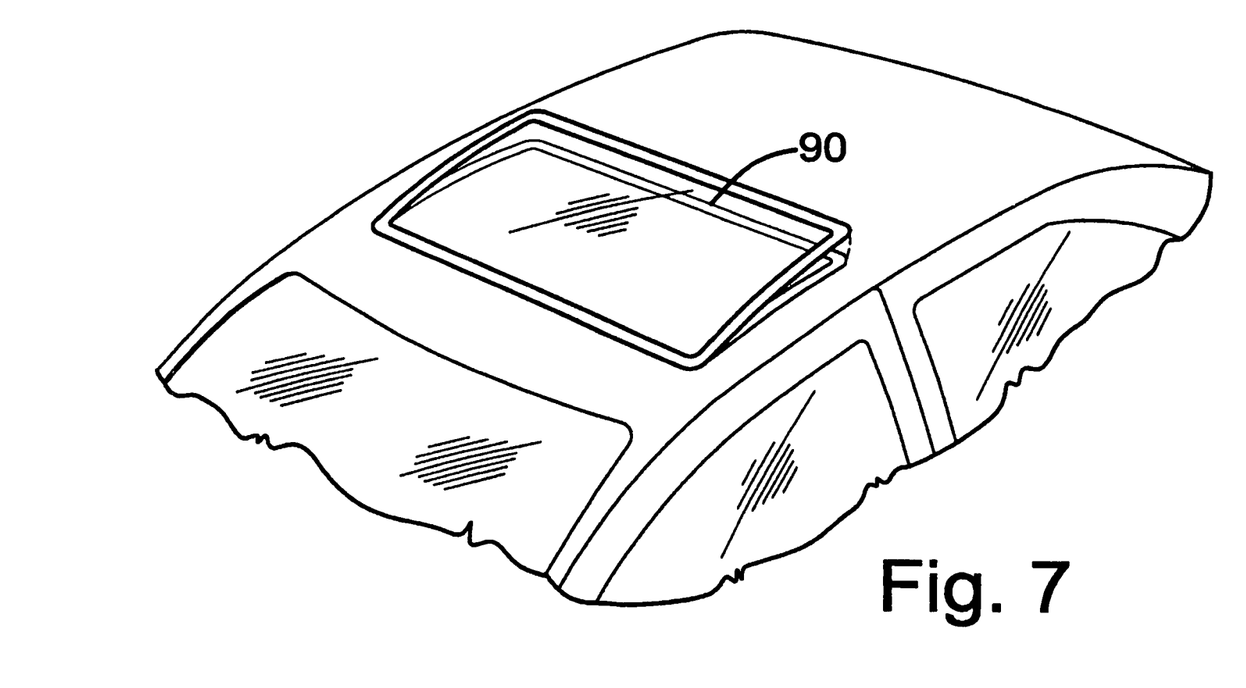
FIG. 7 is a perspective view of a window assembly of the present invention as utilized in a movable sunroof.

FIG. 7 shows an openable sunroof 90 (as opposed to a removable sunroof) in an open position. In this configuration, the seals of FIG. 1, FIG. 2, FIG. 3 and FIG. 8 would be in the positions depicted in the referenced figures.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications.

What is claimed is:

1. An encapsulated vehicle window assembly comprising:
a glass substrate having at least one major surface and a peripheral edge surface therearound; and
a self-conforming, non-engaging seal molded onto at least a peripheral portion of the substrate, the seal comprising:
a base portion having at least one bonding surface in intimate bonding contact with one or more surfaces of the glass substrate; and
an open lip portion extending from the base portion in a curved configuration and capable of sealing a gap between the peripheral edge surface of the encapsulated window assembly and of a peripheral edge of sheet metal forming a vehicle body opening into which the encapsulated window assembly is installed,
wherein the lip portion has a length at least 200% greater than the size of the gap between the edge surface of the encapsulated window assembly and the vehicle body opening, and further wherein the seal is comprised of a thermoplastic elastomer material having a durometer of 60-90 Shore A and the lip portion is configured to exert a sealing force of between 0.50 lb/100 mm (2.2N/100 mm) and 6 lb/100 mm (26.6N/100 mm) on the peripheral edge of the sheet metal of the vehicle body opening.

2. The encapsulated window assembly defined in claim 1, wherein the material of the seal comprises a SEBS TPE material.

3. The encapsulated window assembly of claim 1, wherein the durometer of the thermoplastic elastomer material is 75-85 Shore A.

4. The encapsulated window assembly defined in claim 1, wherein the force exerted by the seal on the peripheral edge of the sheet metal of the vehicle body opening is between 2 lb/100 mm (8.8N/100 mm) and 6 lb/100 mm (26.6N/100 mm).

5. The encapsulated window assembly defined in claim 1, wherein a male stop extends from the base portion toward the lip portion so as to forcibly contact the lip portion after a predetermined amount of deformation of the lip portion.

6. An encapsulated vehicle window assembly comprising a glass substrate having an opposed pair of major surfaces and a peripheral edge surface therebetween, with a self-engaging seal molded onto a peripheral portion of the substrate, the seal comprising:
a base portion having at least one bonding surface in intimate bonding contact with one or more surfaces of the glass substrate;
an open lip portion extending from the base portion in a curved configuration, the lip portion including a female engaging portion at or near a distal end of the lip portion; and
a male engaging portion also extending from the base portion in an orientation so as to be selectively engageable with the female engaging portion upon deformation of the lip portion,
wherein the seal is comprised of a thermoplastic elastomer having a durometer of 60-90 Shore A and the lip portion is configured to exert a force of between 0.50 lb/100 mm (2.2 N/100 mm) and 6 lb/100 mm (26.6 N/100 mm) on the peripheral edge of the sheet metal of the vehicle body opening.

7. The encapsulated window assembly defined in claim 6, wherein the self-engaging seal comprises a thermoplastic elastomer material with a styrenic block copolymer.

8. The encapsulated window assembly defined in claim 7, wherein the self-engaging seal comprises a SEBS TPE material.

9. An encapsulated vehicle window assembly comprising a glass substrate having an opposed pair of major surfaces terminating in a peripheral edge surface, with a lockable self-engaging seal molded only onto a peripheral portion of the substrate, the seal comprising:
a base portion having at least one bonding surface in intimate bonding contact with one or more surfaces of the glass substrate;
a lip portion extending from the base portion in a curved configuration, the lip portion including a lockable female engaging portion formed in a predetermined location in the lip portion; and
a male engaging portion also extending from the base portion in an orientation so as to be selectively lockably engageable with the lockable female engaging portion upon deformation of the lip portion, wherein the material of the seal is a thermoplastic elastomer material having a durometer of 60-90 Shore A.

10. The encapsulated window assembly defined in claim 9, wherein the thermoplastic elastomer material comprises a SEBS TPE material.

11. The encapsulated window assembly defined in claim 9, wherein the lip portion of the seal has a length at least 200% greater than the distance between the edge of the glass substrate and the sheet metal of the vehicle body opening.

* * * * *